(12) United States Patent
Legault et al.

(10) Patent No.: US 10,871,226 B2
(45) Date of Patent: Dec. 22, 2020

(54) MANUAL DEVICE FOR RELEASING AN AUTOMATIC TRANSMISSION FROM PARK GEAR

(71) Applicant: Dura Operating, LLC, Auburn Hills, MI (US)

(72) Inventors: David Legault, Grosse Pointe Farms, MI (US); Jian Ming Yan, Windsor (CA); Chadd Beals, Highland, MI (US)

( * ) Notice: Subject to any disclaimer, the term of this patent is extended or adjusted under 35 U.S.C. 154(b) by 100 days.

(21) Appl. No.: 16/207,733

(22) Filed: Dec. 3, 2018

(65) Prior Publication Data
US 2019/0178378 A1    Jun. 13, 2019

Related U.S. Application Data

(60) Provisional application No. 62/596,346, filed on Dec. 8, 2017.

(51) Int. Cl.
| | | |
|---|---|---|
| F16H 59/10 | (2006.01) | |
| F16H 63/34 | (2006.01) | |
| F16H 59/02 | (2006.01) | |
| B60T 1/00 | (2006.01) | |
| B60T 1/06 | (2006.01) | |
| B60T 17/22 | (2006.01) | |
| F16D 63/00 | (2006.01) | |
| B60T 7/10 | (2006.01) | |
| F16D 127/02 | (2012.01) | |

(52) U.S. Cl.
CPC .......... *F16H 63/3491* (2013.01); *B60T 1/005* (2013.01); *B60T 1/062* (2013.01); *B60T 7/10* (2013.01); *B60T 17/221* (2013.01); *F16D 63/006* (2013.01); *F16H 59/0278* (2013.01); *F16H 59/10* (2013.01); *B60T 7/101* (2013.01); *B60T 7/104* (2013.01); *F16D 2127/02* (2013.01); *F16H 2059/0282* (2013.01)

(58) Field of Classification Search
CPC .. F16H 63/3491; F16H 59/0278; F16H 59/10; B60T 17/221
See application file for complete search history.

(56) References Cited

U.S. PATENT DOCUMENTS

| | | | |
|---|---|---|---|
| 9,062,752 B2 | 6/2015 | Fournier | |
| 9,855,930 B2 * | 1/2018 | Al-Regib | ................ B60T 1/005 |
| 9,927,028 B2 * | 3/2018 | Shin | .................... F16H 63/3491 |
| 10,281,039 B2 * | 5/2019 | Dearden | ................. F16C 1/145 |

(Continued)

FOREIGN PATENT DOCUMENTS

| | | |
|---|---|---|
| KR | 101671923 B1 | 11/2016 |
| WO | 2017003481 A1 | 1/2017 |

*Primary Examiner* — David M Fenstermacher
(74) *Attorney, Agent, or Firm* — Vivacqua Crane PLLC

(57) ABSTRACT

A manual park release device includes a base portion. A handle portion is rotatably coupled to the base portion to move from a retracted position to an extended position. The handle portion during rotation toward the extended position exerts a pulling force to displace a tension cable connected to an automatic transmission of an automobile vehicle to change from a first park gear to a second neutral gear. A first locking feature releasably restricts rotational movement of the handle portion away from the retracted position. A second locking feature releasably restricts rotational movement of the handle portion away from the extended position.

13 Claims, 12 Drawing Sheets

(56) References Cited

U.S. PATENT DOCUMENTS

2013/0020171 A1\* 1/2013 Jang ................ B60T 11/046
                                                       192/220.2
2014/0326101 A1\* 11/2014 Han ................. B60T 7/102
                                                        74/502.2

\* cited by examiner

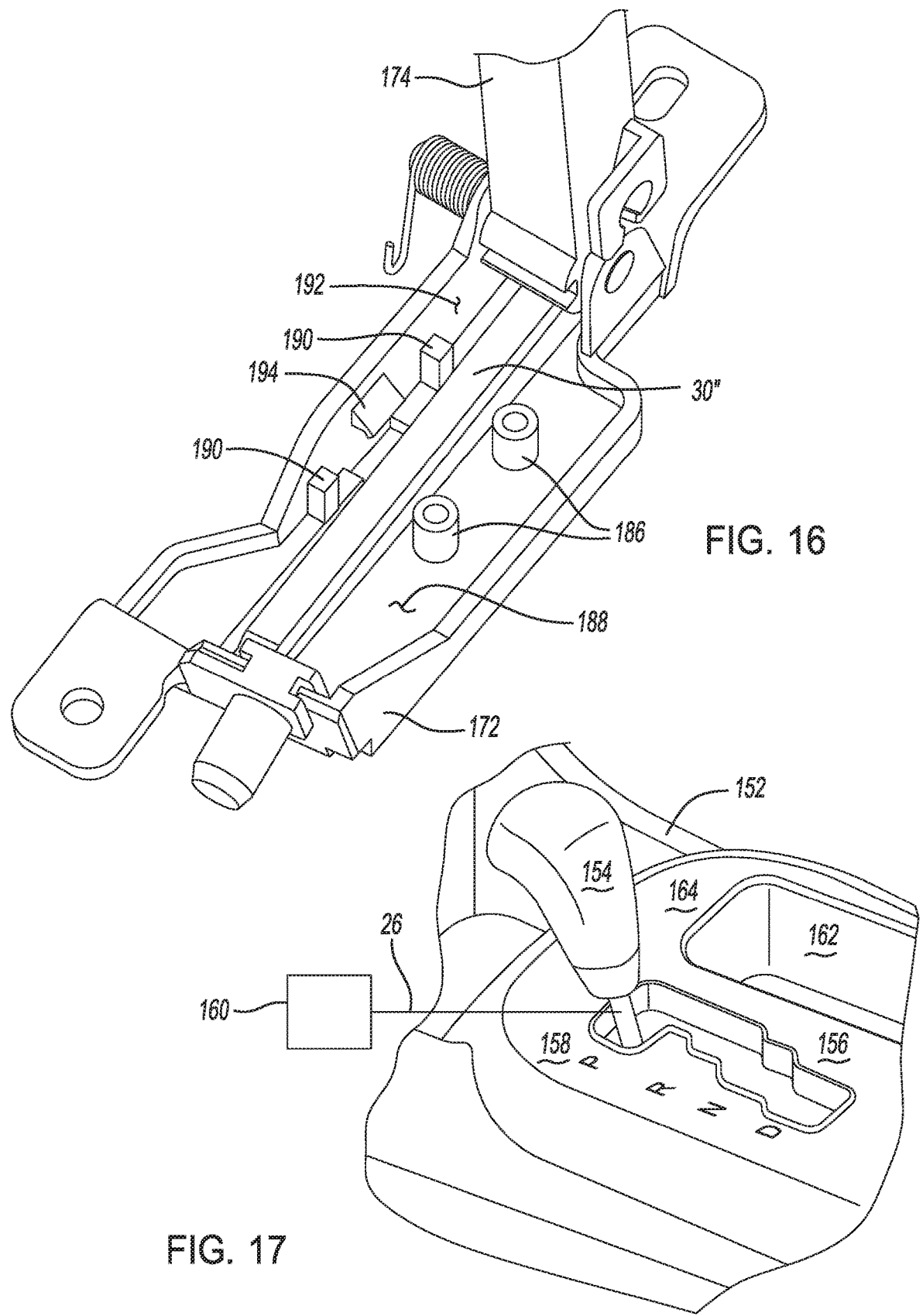

MANUAL DEVICE FOR RELEASING AN AUTOMATIC TRANSMISSION FROM PARK GEAR

This application claims benefit to prior U.S. Application Ser. No. 62/596,346, filed on Dec. 8, 2017. The entire disclosure of the above application is hereby incorporated by reference.

FIELD

The present disclosure relates generally to automobile vehicle automatic transmission park release mechanisms.

BACKGROUND

The statements in this section merely provide background information related to the present disclosure and may or may not constitute prior art.

Automobile vehicles provided with an automatic transmission may be locked in park gear, preventing motion of the vehicle, if the vehicle loses electrical power. During such an event, it may be desirable to release the transmission from park gear to allow movement such as to tow the vehicle. For this reason, a manual park release device is commonly provided. Known manual park release devices for automatic transmission vehicles include an operating member such as a handle operable by a user to manually shift the automatic transmission from a park gear to a neutral gear typically in the event of an electrical or motive power loss. Common manual park release systems utilize a tension cable between the manual park release device and a transmission gear shift linkage to shift the transmission. Specifically, to move the transmission from the park position to the neutral position, the tension cable is typically pulled by rotation of the handle.

In manual park release devices with a handle, generally the handle is movable between at least two positions: a retracted position wherein the handle does not extend outwardly from a surrounding area and the transmission is in the park position; and an extended position wherein at least a portion of the handle is positioned away from the surrounding area and the transmission is positioned in another gear such as neutral.

Manual park release devices are intended for use only in select situations, so the handle is typically not readily accessible by a user of the vehicle and is often hidden within or under a trim panel or other inconspicuous space such as a door jamb or a foot well. An orientation and position of the handle are generally designed to obscure or otherwise conceal the handle in the retracted position to prevent inadvertent operation. To further mitigate against inadvertent operation, it is also a common design requirement that a separate tool such as a screwdriver be used to release the device from its retracted or inactivated position. In common designs, a handle generally lies flat with respect to a base to minimize protrusion into the surrounding area in the vehicle. Because the manual park release device can actuate the transmission separately from a transmission shifter device, it is beneficial to provide mechanisms to selectively lock the stored or deactivated position of the manual park release handle and therefore the shift linkage to prevent unintended actuation of the transmission. Similarly, it is beneficial to provide a mechanism to selectively lock the position of the manual park release handle when in the extended (activated) state to prevent an inadvertent shift to park gear during movement of the vehicle.

While known park release mechanisms provide the above functionalities, known park release mechanisms often fail to properly lock in either the retracted or extended (activated) positions, and designs that initially require use of a separate tool to prevent inadvertent use often can be activated without the tool, therefore allowing inadvertent operation or damage to the mechanism. Thus, while current park release mechanisms achieve their intended purpose, there is a need for a new and improved park release mechanism.

SUMMARY

According to several aspects, a manual park release device for an automatic transmission includes a base portion, a handle portion rotatably coupled to the base portion to move from a retracted position to an extended position, the handle portion during rotation toward the extended position exerting a force to displace a tension cable connected to the automatic transmission to change from a first gear to a second gear, a first locking feature coupled to the base portion to restrict rotational movement of the handle portion when in the retracted position, and a second locking feature coupled to the base portion to restrict movement of the handle portion when in the extended position.

In one aspect, the first locking feature includes a flexible beam having a fixed end connected to the base portion and a free end engaged with the handle portion when in the retracted position.

In another aspect, the handle portion includes a rotating member having a first slot and the free end of the flexible beam engages the first slot when the handle portion is in the retracted position.

In another aspect, the handle portion includes an opening in alignment with the flexible beam to allow the flexible beam to be deflected out of engagement with the first slot to release the first locking feature.

In another aspect, a cover is disposed within the base portion between the flexible member and the handle portion, the cover defining a window, wherein the window is in alignment with the flexible member and the opening in the handle portion, and wherein the window is smaller than the opening.

In another aspect, the rotating member further includes a second slot and the free end of the flexible beam engages the second slot when the handle portion is in the extended position.

In another aspect, the second slot is oriented 90 degrees from the first slot on a periphery of the rotating member.

In another aspect, the handle portion includes a first end wall and a second end wall opposite the first end wall and the first end wall engages the flexible member when the handle portion is in the retracted position.

In another aspect, the second end wall engages the flexible member when the handle portion is in the extended position.

In another aspect, the flexible member includes a first notch disposed adjacent the free end and a second notch disposed adjacent the free end on a side of the flexible member opposite the first notch.

In another aspect, the first notch engages the first end wall when the handle portion is in the retracted position and the second notch engages the second end wall when the handle is in the extended position.

In another aspect, the flexible beam defines an aperture at the free end that engages the handle portion when in the retracted position.

In another aspect, the handle portion includes a tab that engages the aperture of the flexible beam when in the retracted position.

In another aspect, the handle portion defines an opening and the flexible beam is extended through the opening when the handle portion is in the retracted position.

In another aspect, the first locking feature includes a rotating member having a first section connected to a second section by a living hinge, wherein the first section engages the base portion and the second section engages the handle portion when in the retracted position.

In another aspect, the handle portion includes a tab that engages the second section when in the retracted position.

In another aspect, the rotating member includes a sloping face accessible through an opening in the handle portion, the sloping face engageable to pivot the second section at the living hinge away from the tab to allow the handle portion to move to the extended position.

In another aspect, the second locking feature includes a second flexible beam connected to the base portion and having a slot engaged with the handle portion when in the extended position.

In another aspect, the handle portion includes a tab that engages the slot when in the extended position.

In another aspect, a biasing member is connected between the base portion and the handle portion to bias the handle portion to the retracted position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 16 is a top perspective view of the manual park release device of FIGS. 14 and 15 with the release cover removed; and FIG. 17 is a top perspective view of an automobile console having an access cavity providing access to a manual park release device of the present disclosure.

DETAILED DESCRIPTION

The following description is merely exemplary in nature and is not intended to limit the present disclosure, application, or uses.

Figure 1:
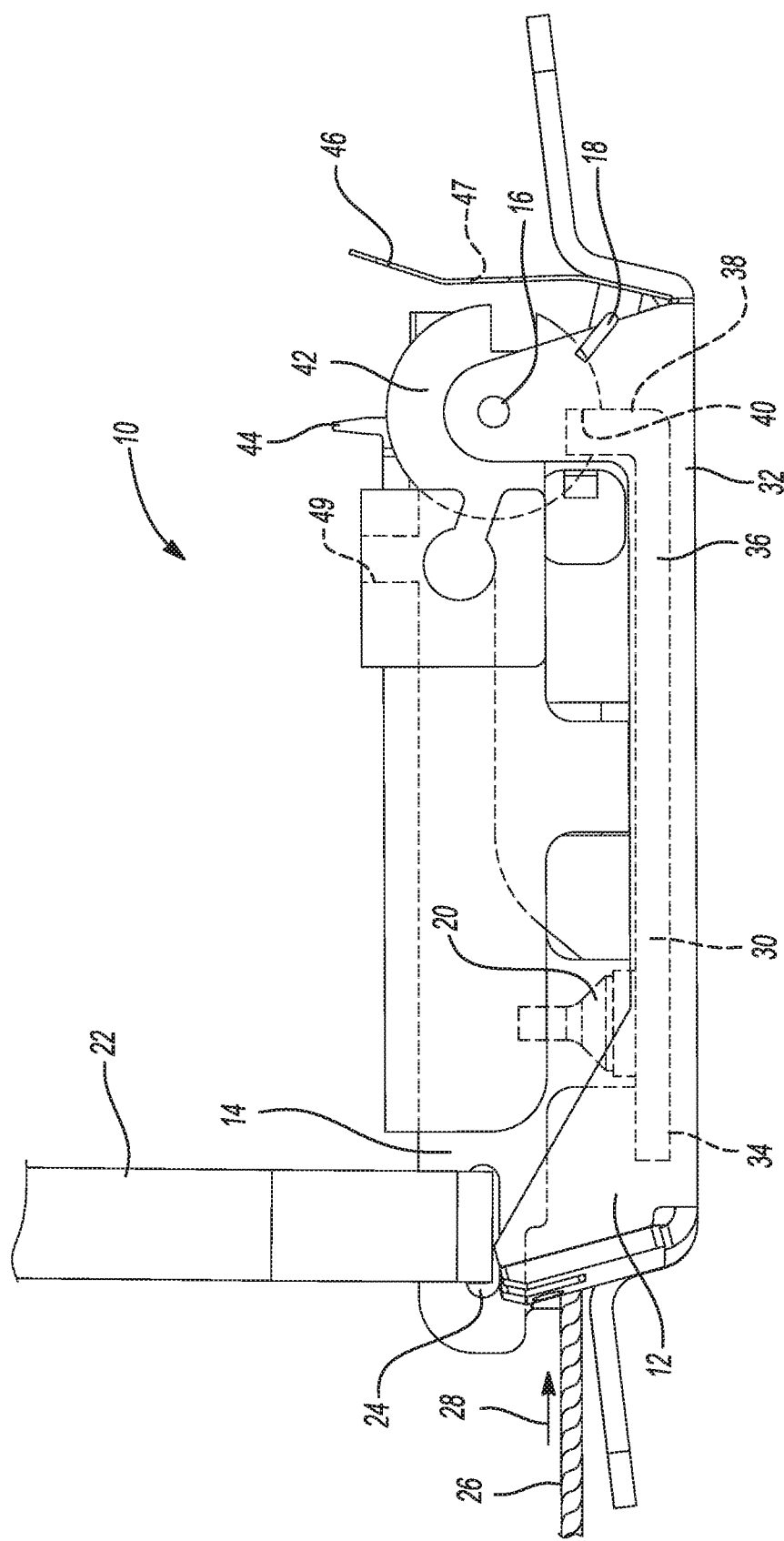
FIG. 1 is a partial cross sectional front elevational view of a manual park release device in a retracted position according to an exemplary embodiment.

Referring to FIG. 1, a manual park release device 10 includes a first or base portion 12 to which is rotatably coupled a second or handle portion 14 using a pin 16. The base portion 12 is fixed, for example by fastening to a component of a motor vehicle, which is shown and described in greater detail in reference to FIG. 17. According to several aspects, the base portion 12 and the handle portion 14 are both made of a polymeric material, for example using an injection molding process. A spring or biasing member 18 which may be made of a material such as spring steel, is supported on the pin 16 and is connected to each of the base portion 12 and the handle portion 14. The biasing member 18 normally biases the handle portion 14 toward a closed or retracted position shown, in which the handle portion 14 is oriented substantially parallel with and is in contact with the base portion 12. A resilient material bumper 20 is connected to the handle portion 14 which directly contacts the base portion 12 in the retracted position to minimize noise and vibration between the base portion 12 and the handle portion 14.

In order to release the manual park release device 10 from the retracted position a flexible material handle or strap 22 is provided which is connected to the handle portion 14 by extending through a strap aperture 24 located proximate to a free end of the handle portion 14 spaced as far away from the pin 16 as practical. As the handle portion 14 rotates away from the retracted position toward a released or extended position which is shown and described in greater detail in reference to FIG. 3, a tension or pulling force is applied to displace a tension cable 26 in a displacement direction 28. The tension cable 26 is connected at one end to the handle portion 14 and at an opposed end (not shown) to an automatic transmission of an automobile vehicle (not shown) to change the transmission from a first or park gear to a second gear such as a neutral gear.

A locking system is provided with the manual park release device 10 to selectively and releasably retain the handle portion 14 in either the retracted position or the extended position. According to several aspects, the locking system includes a flexible beam 30 which according to several aspects is co-molded of the same polymeric material as the base portion 12 and is fixed at a first end or fixed end 34 to the base portion 12 and includes a second end or free end 36 which is freely and elastically movable in opposed up and down directions as viewed in FIG. 1.

In the retracted position shown, an arm 38 of the flexible beam 30 which according to several aspects is integrally fixed at the second end 36 and is oriented generally transverse to the flexible beam 30 is received in a first slot 40 created in a latching member 42 thereby defining a first locking feature. The latching member 42 is connected to and co-rotates with the handle portion 14 and is generally circular having the first slot 40 opening outwardly along an outer perimeter of the latching member 42. The arm 38 is biased toward and into the first slot 40 by a biasing force normally acting to deflect the flexible beam 30 upwardly and away from the base portion 12. The flexible beam biasing force is created by spacing the second end 36 of the flexible beam 30 freely away from the base portion 14 in the as-molded condition of the flexible beam 30 such that during initial assembly of the manual park release device 10 the latching member 42 contacts and elastically deflects the flexible beam 30.

The locking system may further include a second locking feature. According to several aspects, the second locking feature includes a tab 44 integrally formed with and extending away from the handle portion 14. As the handle portion 14 rotates away from the base portion 12 the tab 44 initially deflects a second beam 46 which is connected to the base portion 12. Upon reaching a fully rotated position approximately 80 to 90 degrees from the retracted position and as shown in FIG. 3, the second beam 46 elastically deflects toward its normal position shown in FIG. 1 such that the tab 44 is received in a slot 47 created in the second beam 46 acting to resist the biasing force of the biasing member 18 normally acting to bias the handle portion 14 toward the retracted position.

Referring to FIG. 2 and again to FIG. 1, it is desirable to prevent release of the handle portion 14 from the retracted position during normal operation of the motor vehicle and if the strap 22 is pulled while the arm 38 is biased into the first slot 40. To release the handle portion 14 for rotation away from the retracted position, a tool 48 such as a screwdriver is inserted into an opening 49 created in the handle portion 14 proximate to the latching member 42. A downward force "$F_1$" as shown is applied by the tool 48 to the flexible beam 30 which elastically downwardly deflects the flexible beam 30 as shown until the arm 38 freely releases from the first slot 40. A subsequent upward force "$F_2$" can then be applied using the strap 22 to rotate the handle portion 14 in a direction of rotation 50 about the pin 16.

Figure 2:
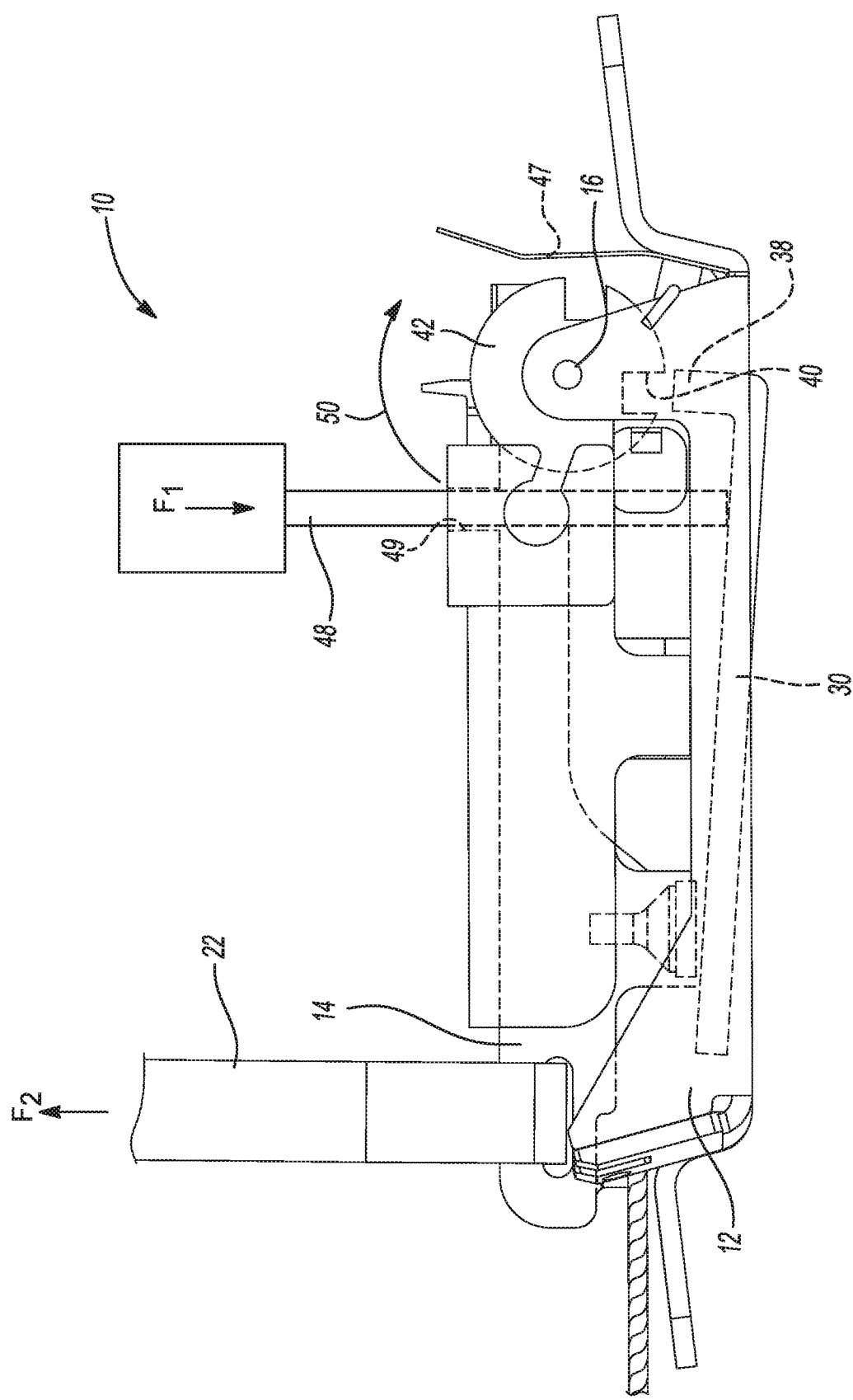
FIG. 2 is a partial cross sectional front elevational view similar to FIG. 1 shown during a release step.

Referring to FIG. 3 and again to FIGS. 1 and 2, the handle portion 14 is shown in the extended position after rotation in the direction of rotation 50 by pulling the strap 22. At this time the second locking feature is actuated, which as previously described includes the second beam 46 elastically deflecting toward its normal position shown such that the tab 44 is received in the slot 47 created in the second beam 46 acting to resist the biasing force of the biasing member 18 normally acting to bias the handle portion 14 toward the retracted position. According to several aspects, the second locking feature can further include a secondary engagement of the arm 38 with the latching member 42. According to these aspects, the latching member 42 further includes a second slot 52 oriented approximately 80 to 90 degrees from the first slot 40. As the handle portion 14 reaches the extended position shown, the biasing force of the flexible arm 30 directs the arm 38 into engagement within the second slot 52, thereafter assisting to resist rotation of the handle portion 14 in a direction of rotation 54 toward the retracted position shown in FIG. 1.

Figure 3:
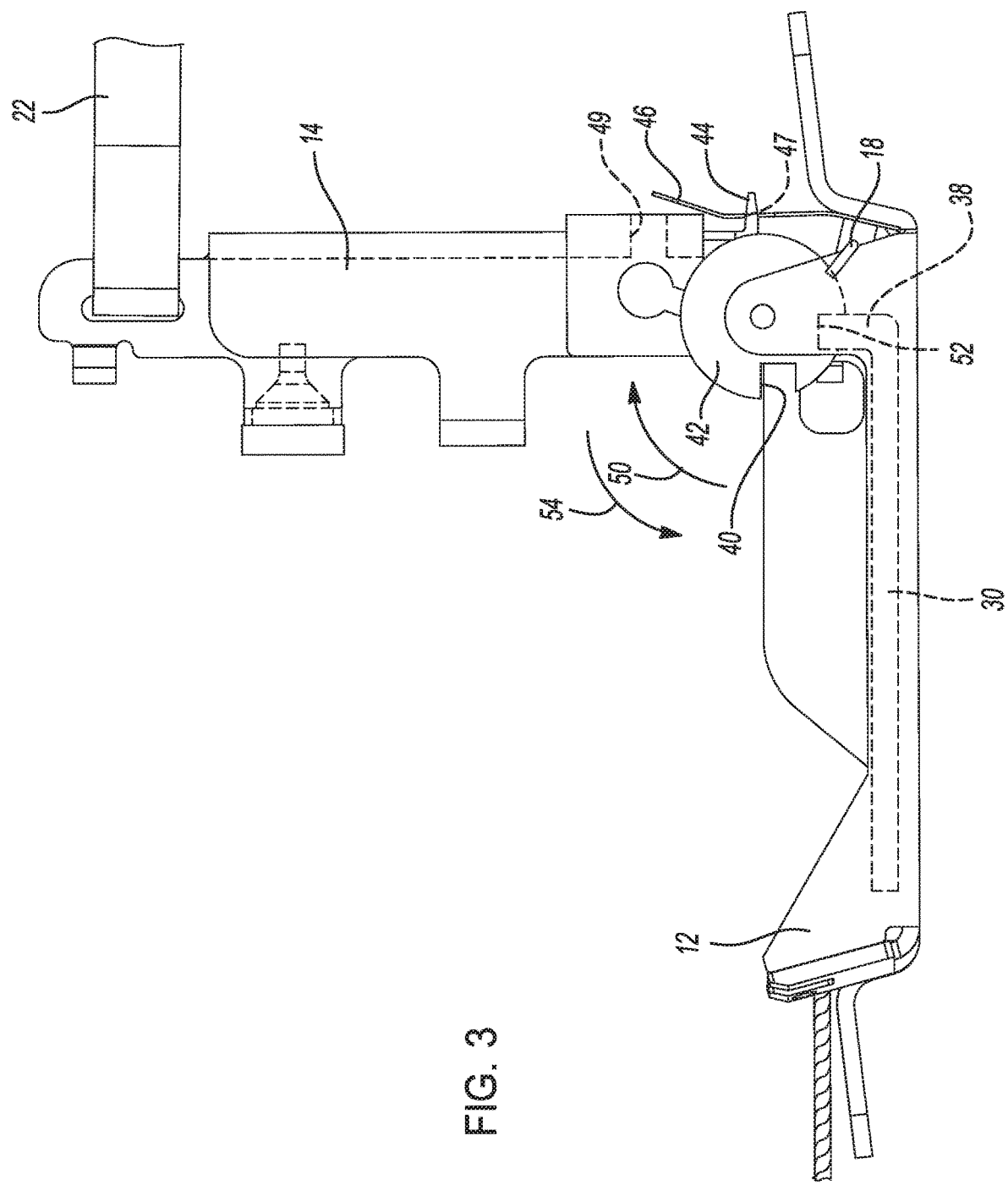
FIG. 3 is a partial cross sectional front elevational view modified from FIG. 1 to show an extended position of the manual park release device.
Figure 4:
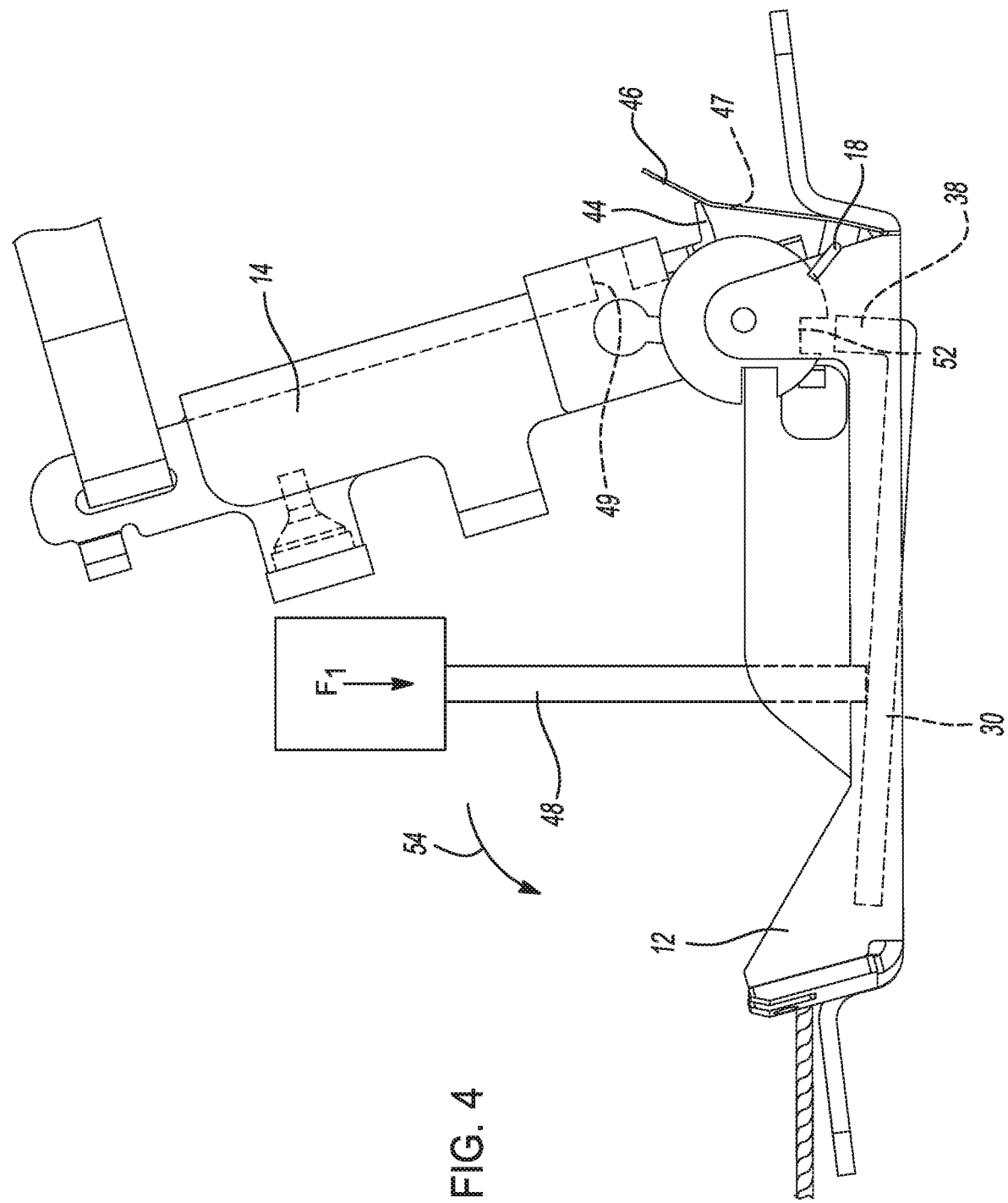
FIG. 4 is a partial cross sectional front elevational view modified from FIG. 3 to show a release step.

Referring to FIG. 4 and again to FIGS. 1 through 3, to release the handle portion 14 for rotation away from the extended position, the tool 48 such as a screwdriver is re-inserted into the opening 49 disposed in the handle portion 14 proximate to the latching member 42. The downward force "$F_1$" as shown is applied by the tool 48 to the flexible beam 30 which elastically downwardly deflects the flexible beam 30 as shown until the arm 38 freely releases from the second slot 52. If the second beam 46 is engaged, the second beam 46 is manually elastically deflected away from its normal position as shown in FIG. 4 such that the tab 44 is released from the slot 47 disposed in the second beam 46. After the arm 38 is freely released from the second slot 52 and the tab 44 is released from the slot 47 in the second beam 46, the biasing force of the biasing member 18 thereafter acts to return the handle portion 14 in the direction of rotation 54 toward the retracted position shown in FIG. 1. The tool 48 is fully retracted to allow complete return of the handle portion.

Referring again to FIG. 1, the manual park release device 10 is shown after return of the handle portion 14 to the retracted position, wherein the arm 38 at the second end 36 of the flexible beam 30 is received in the first slot 40 created in the latching member 42 and the bumper 20 again directly contacts the base portion 12.

Referring to FIG. 5 and again to FIGS. 1 through 4, according to further aspects, a manual park release device 56 is modified from the manual park release device 10, therefore the following discussion of the features of manual park release device 56 is limited to differences from the manual park release device 10. Manual park release device 56 includes a first or base portion 58 to which is rotatably coupled a second or handle portion 60 using a pin 62. The base portion 58 is fixed, for example by fastening to a component of a motor vehicle, similar to that shown and described in greater detail in reference to FIG. 17. According to several aspects, the base portion 58 and the handle portion 60 are both made of a metal material such as steel or aluminum, formed for example by a brake to provide the features of the manual park release device 56.

A spring or biasing member 64 which may be made of a material such as spring steel, is supported on the pin 62 and is connected to each of the base portion 58 and the handle portion 60, and normally biases the handle portion 60 toward the closed or retracted position shown. A strap 66 similar to the strap 22 is provided to manually displace the handle portion 60. The functions of the previously described flexible beam 30 are retained in the manual park release device 56, however the flexible beam 30 is replaced by a flexible beam 68, made for example from an elastically flexible metal such as a spring steel. The flexible beam 68 is independently fixed to the base portion 58 using for example a fastener such as a rivet or a screw, or by a tack weld. The handle portion 60 is modified from the handle portion 14 to include a first end wall 70 and an opposed second end wall 72, both oriented parallel to each other, both positioned proximate to the pin 62 but extending away from the pin 62 oppositely directed with respect to the strap 66.

Figure 5:
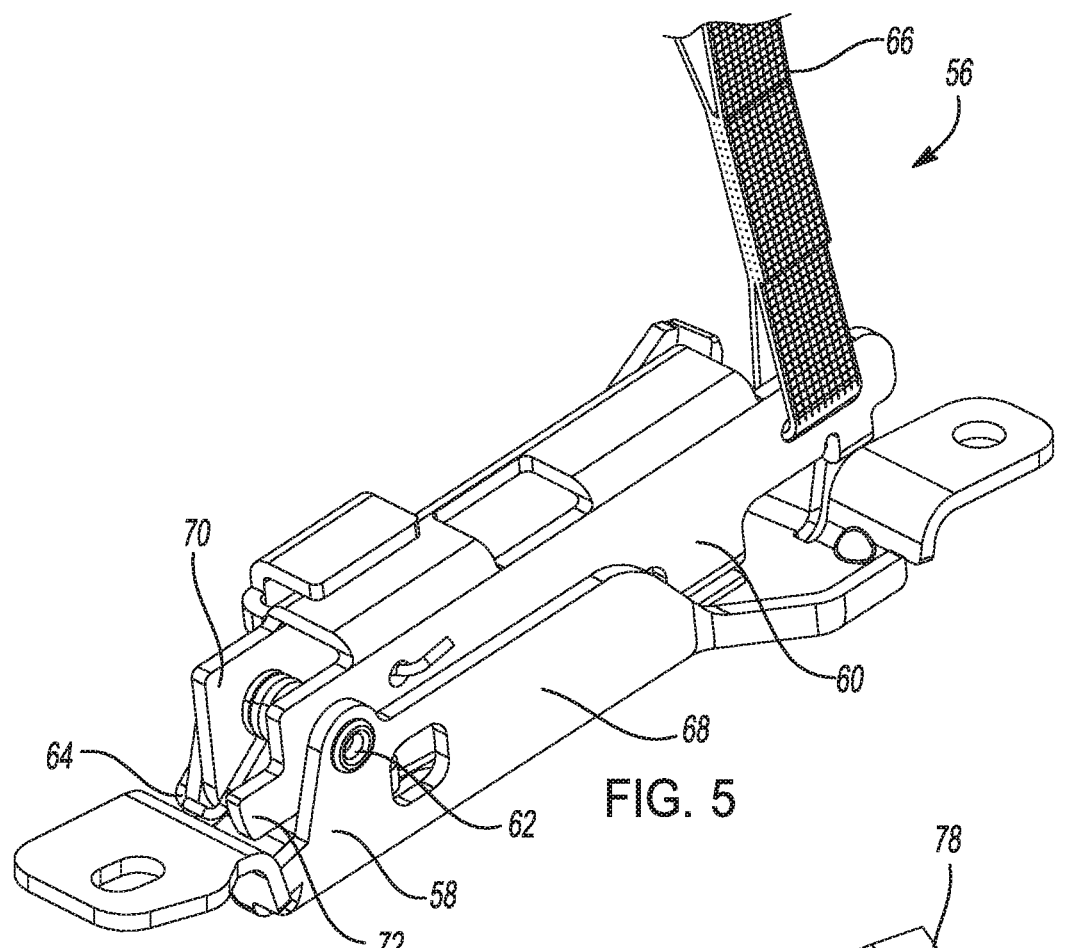
FIG. 5 is a partial cross sectional front elevational view of a manual park release device in a retracted position according to another exemplary embodiment.

Referring to FIG. 6 and again to FIG. 5, the flexible beam 68 includes an aperture 74 proximate a first end 76 which receives the fastener mounting the flexible beam 68 to the base portion 58. Proximate to an opposite second end 78 are each of a first notch 80 facing toward an end wall 82 of the second end 78 and a second notch 84 which is oppositely directed with respect to the first notch 80, and therefore directed toward the first end 76 of the flexible beam 68.

Figure 6:
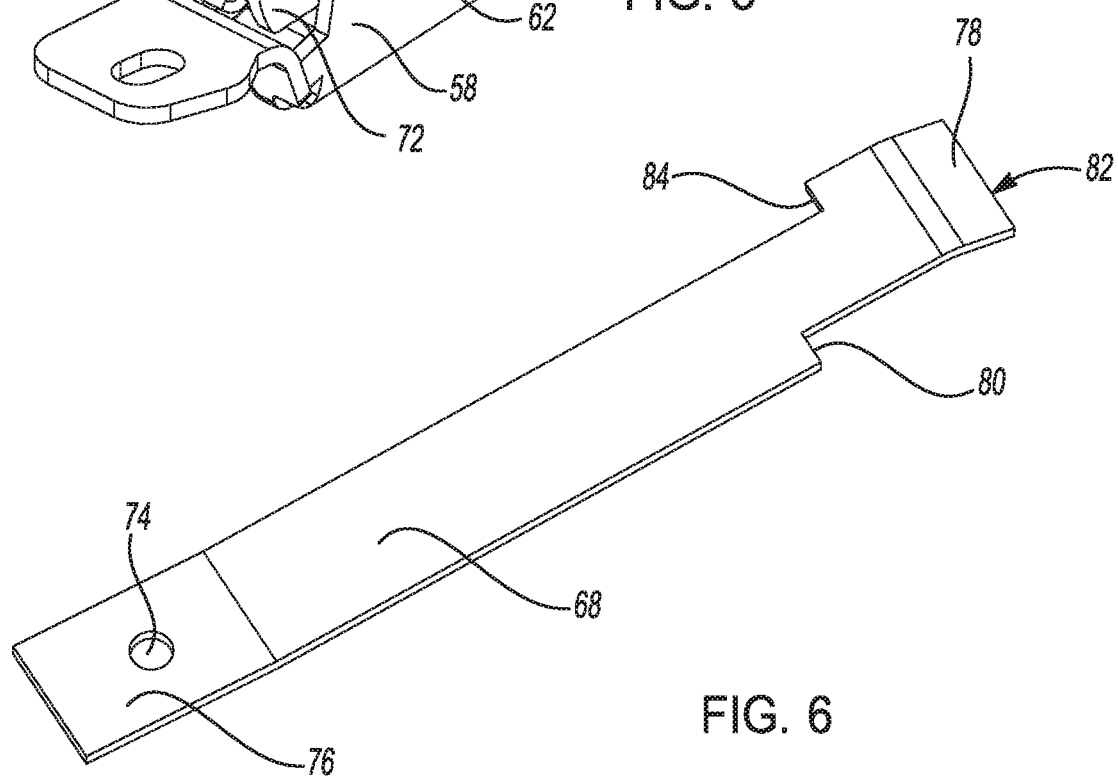
FIG. 6 is a top perspective view of a flexible beam of the manual park release device of FIG. 5.

Referring to FIG. 7 and again to FIGS. 5 and 6, with the handle portion 60 in the retracted position shown, the biasing member 64 biases the handle portion 60 in a direction of rotation 86 about the pin 62. A biasing force acting on the flexible beam 68 deflects the flexible beam 68 upward in an arc of rotation 87, until a portion of the flexible beam 68 is positioned between the first end wall 70 and the opposed second end wall 72. In this position, a section 88 of the first end wall 70 overlaps the flexible beam 68 within the first notch 80, such that a face 90 of the section 88 contacts a notch face 92 of the flexible beam 68 in the first notch 80, thereby preventing rotation of the handle portion 60 in a direction of rotation 94 about the pin 62. This configuration defines a first locking feature of the manual park release device 56.

Similar to the release of the manual park release device 10 described in reference to FIG. 2, the manual park release device 56 can be released from the retracted position by placement of a tool similar to the tool 48 between the first end wall 70 and the second end wall 72 and displacing the flexible beam 68 in a downward arc of rotation 96 until the flexible beam 68 is freely below the section 88 of the first end wall 70. The handle portion 60 can then be manually rotated in the direction of rotation 94 against the biasing force of the biasing member 64.

Figure 7:
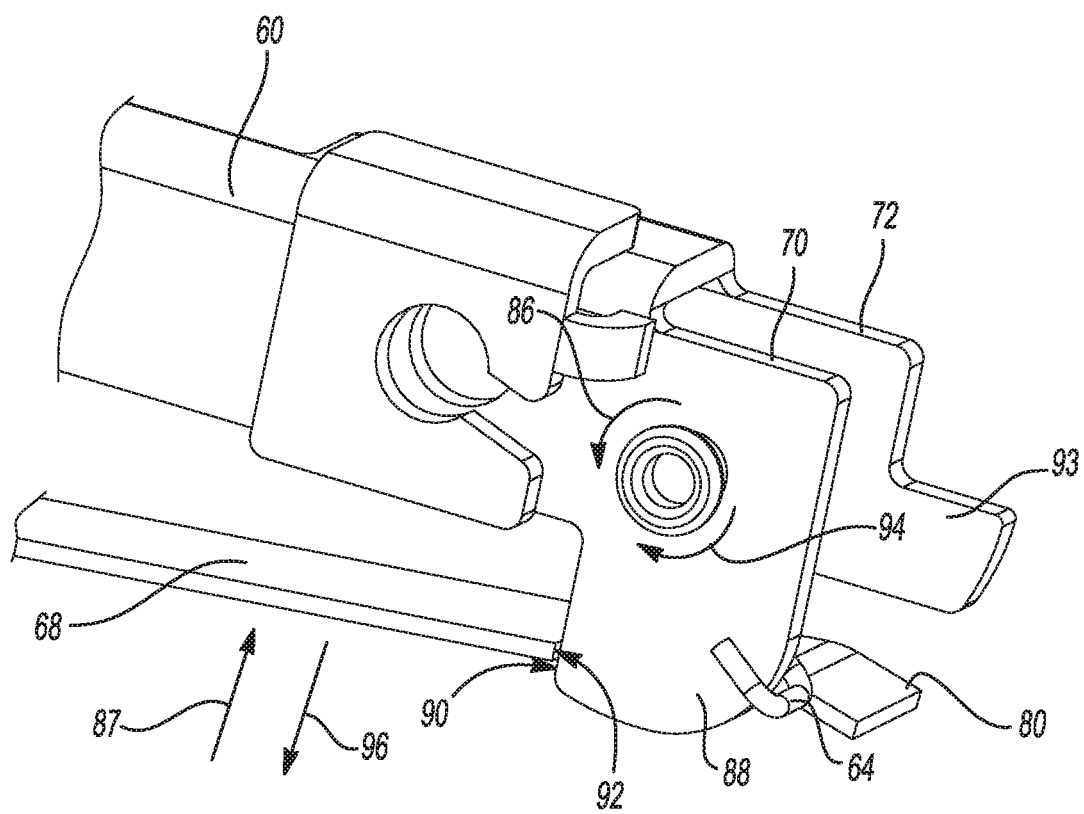
FIG. 7 is a front right perspective view of a portion of the manual park release device of FIG. 5.
Figure 8:
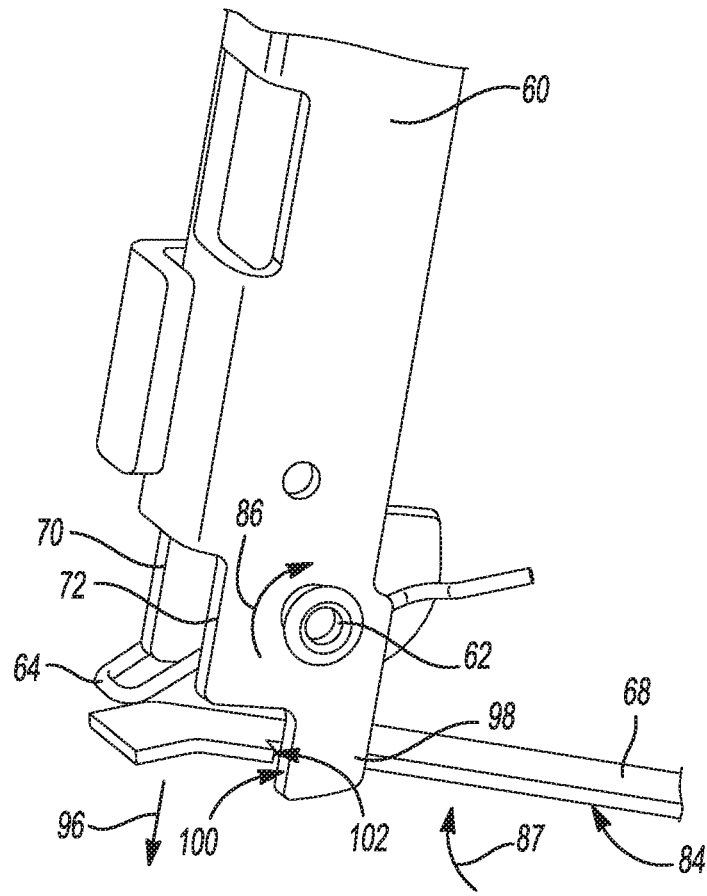
FIG. 8 is a front left perspective view of a portion of the manual park release device of FIG. 5 shown in an extended position.

Referring to FIG. 8 and again to FIGS. 5 through 7, when the handle portion 60 is manually rotated to the extended position shown, the flexible beam 68 provides a second locking feature of the manual park release device 56. The biasing force acting on the flexible beam 68 deflects the flexible beam 68 upward in the arc of rotation 87, until a portion of the flexible beam 68 is positioned between the first end wall 70 and the opposed second end wall 72. In this position, a section 98 of the second end wall 72 overlaps the flexible beam 68 within the second notch 84, such that a face 100 of the section 98 contacts a notch face 102 of the flexible beam 68 in the second notch 84, thereby preventing rotation of the handle portion 60 in the direction of rotation 86 about the pin 62.

Similar to the release of the manual park release device 10 described in reference to FIG. 4, the manual park release device 56 can be released from the extended position by placement of a tool similar to the tool 48 between the first end wall 70 and the second end wall 72 and displacing the flexible beam 68 in the downward arc of rotation 96 until the flexible beam 68 is freely below the section 98 of the second end wall 72. The handle portion 60 then rotates in the direction of rotation 86 using the biasing force of the biasing member 64 to return to the retracted position shown in FIG. 6.

Referring to FIG. 9 and again to FIGS. 1 through 8, a manual park release device 104 is modified from the manual park release device 10 and the manual park release device 56 to replace the flexible beam 30 and the flexible beam 68 respectively with a rotating member 106 which acts as a first locking feature. Manual park release device 104 includes a first or base portion 108 to which is rotatably coupled to a second or handle portion 110 using a pin 112. The base portion 108 is fixed, for example by fastening to a component of a motor vehicle, similar to that shown and described in greater detail in reference to FIG. 17. According to several aspects, the base portion 108 and the handle portion 110 are both made of either a metal material such as steel or aluminum, formed for example by a brake, or a polymeric material made for example using an injection molding operation to provide the features of the manual park release device 104.

Components of the manual park release device 104 that are common in design and function with components of the manual park release device 10 such as the second locking feature defined by the tab 44' and the second beam 46' are identified using a prime symbol associated with the part number and are therefore not further discussed herein. According to several aspects, the rotating member 106 is accessed to release the handle portion 110 from the retracted position shown via an opening 114 created in the top face of the handle portion 110. When engaged, the rotating member 106 disengages from a flange 116 extending from the handle portion 110 to allow the handle portion 110 to release for rotation away from the engaged position shown to an extended position similar to the extended position discussed above with respect to FIG. 3.

Figure 9:
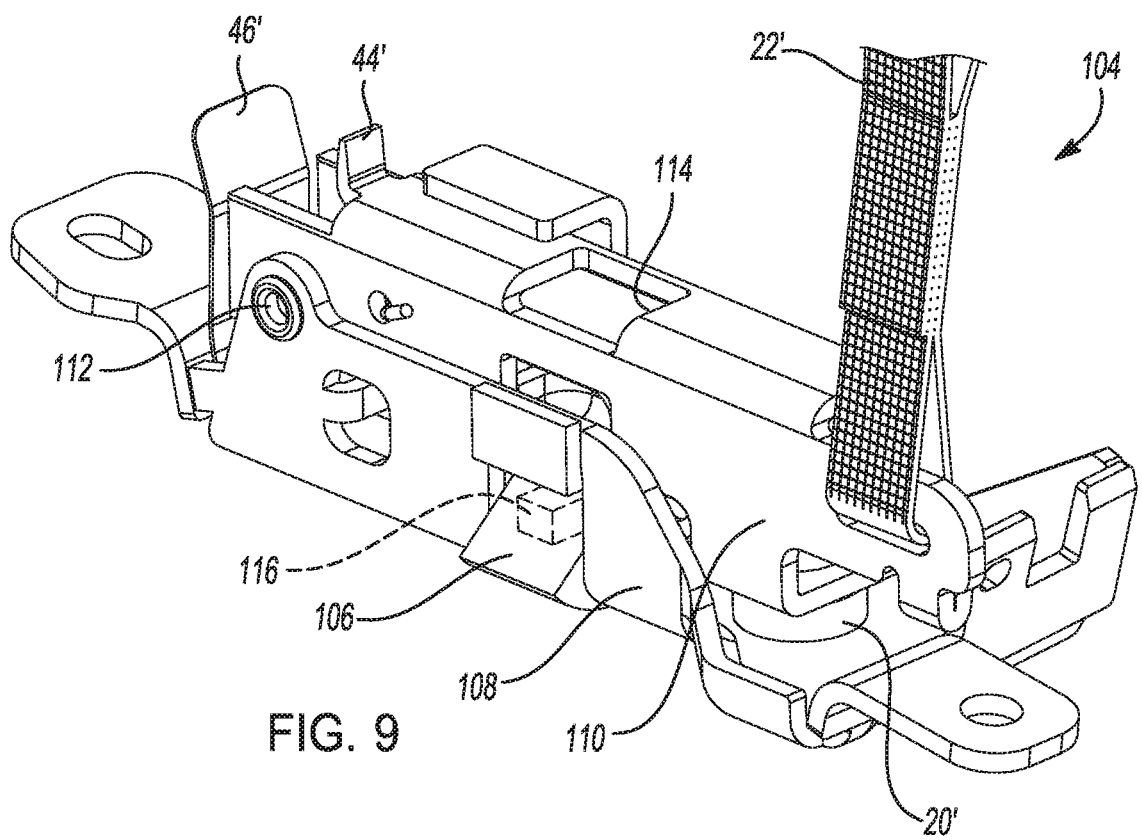
FIG. 9 is a front right perspective view of a manual park release device in a retracted position according to another exemplary embodiment.

Referring to FIG. 10 and again to FIG. 9, according to several aspects, the rotating member 106 is molded from a polymeric material and includes a first section 118 which engages a wall section 120 of the base portion 108 to prevent rotation or release of the first section 118. A second section 122 of the rotating member 106 is integrally connected to the first section 118 by a living hinge 124. A sloping face 126 is positioned within the base portion 108 to be accessible for contact only by a tool 128 shown and described in reference to FIG. 12, which is similar to the tool 48, via the opening 114.

Figure 10:
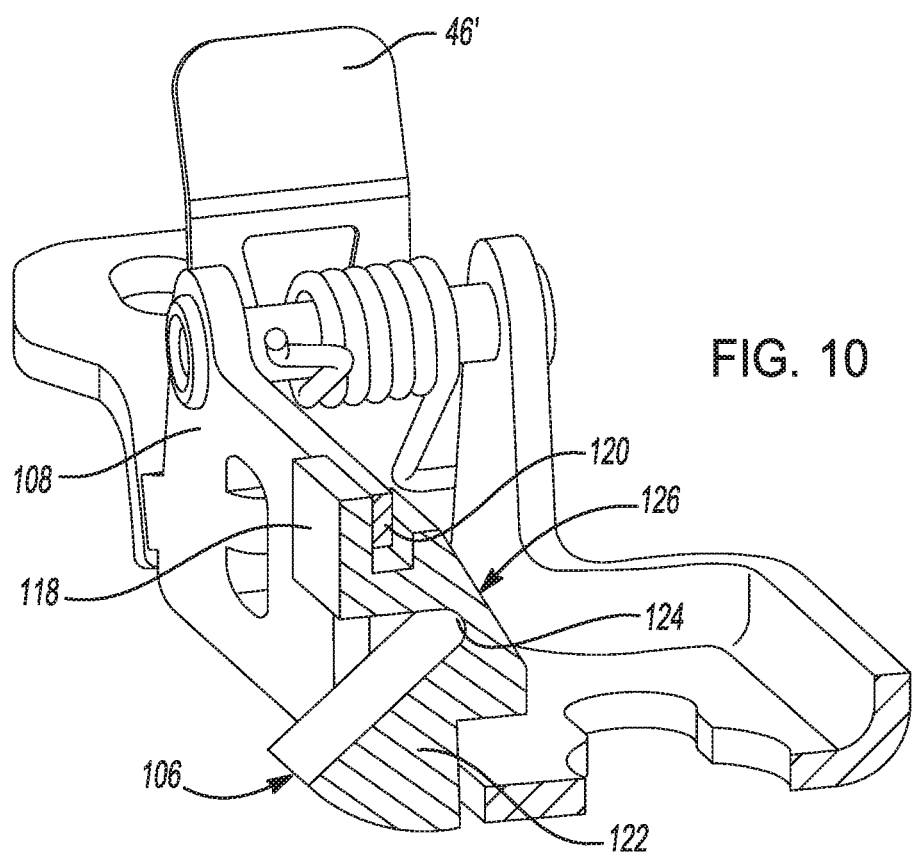
FIG. 10 is a partial cross-sectional perspective view of the manual park release device of FIG. 9.
Figure 11:
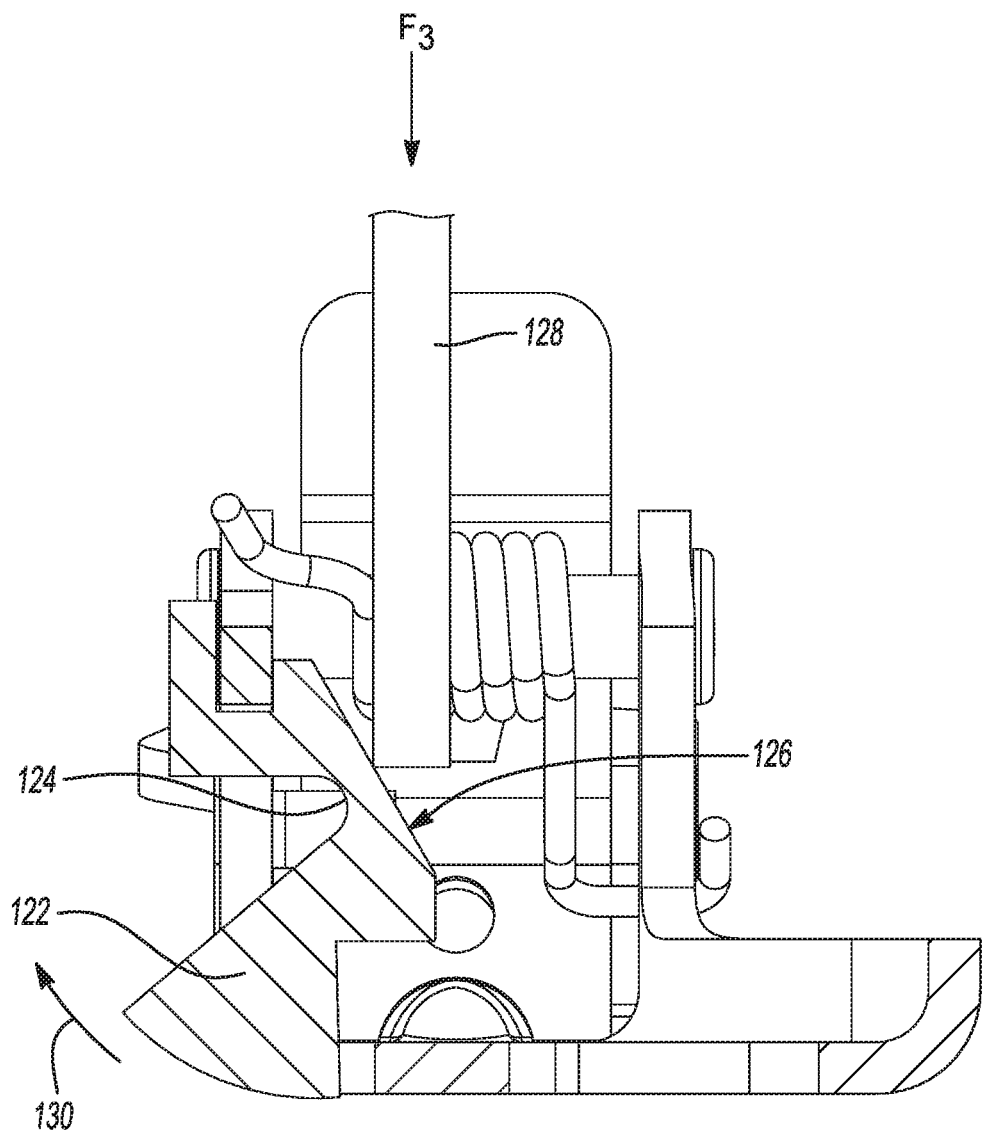
FIG. 11 is a partial cross-sectional end elevational view of the manual park release device of FIG. 9.

Referring to FIG. 11 and again to FIGS. 9 and 10, to release the handle portion 110 for rotation to the extended position the tool 128 is inserted downwardly through the opening 114 in the handle portion 110 until the tool 128 contacts the sloping face 126 of the rotating member 106. After the tool 128 is positioned at or below an elevation of the living hinge 124 further downward displacement of the tool 128 applying a force $F_3$ causes the second section 122 to outwardly rotate about the living hinge 124 in an arc of rotation 130, thereby clearing the flange 116 and allowing release and rotation of the handle portion 110 about the pin 112.

Referring to FIG. 12 and again to FIGS. 1 through 11, a manual park release device 132 is modified from the manual park release device 10, the manual park release device 56 and the manual park release device 104. Manual park release device 132 includes a first or base portion 134 to which is rotatably coupled to a second or handle portion 136 using a pin 138. The base portion 134 is fixed, for example by fastening to a component of a motor vehicle, similar to that shown and described in greater detail in reference to FIG. 17. According to several aspects, the base portion 134 and the handle portion 136 are both made of either a metal material such as steel or aluminum, formed for example by a brake, or a polymeric material made for example using an injection molding operation to provide the features of the manual park release device 132.

Components of the manual park release device 132 that are common in design and function with components of the manual park release devices 10 and 104 such as the second locking feature defined by engagement of the tab 44' and the second beam 46' are identified using a prime symbol associated with the part number and are therefore not further discussed herein. According to several aspects, a beam 140 similar in design to the second beam 46' is centrally positioned in the manual park release device 132 and is accessed with a tool to release the handle portion 136 from the retracted position shown via an opening 142 created in the top face of the handle portion 136. The beam 140 is fixed to the base portion 134 using a fastener 144 and is elastically deflectable in an arc of rotation 146 when contacted by the tool.

The beam 140 includes an aperture 148 which releasably captures a tab 150 integrally extending from the handle portion 110 to retain the manual park release device 132 in the retracted position shown, thereby defining a first locking feature of the manual park release device 132. To allow the handle portion 136 to release for rotation away from the retracted position shown to an extended position similar to the extended position discussed above with respect to FIG. 3, the beam 140 is elastically deflected in the arc of rotation 146 until the tab 150 is no longer captured in the aperture 148.

Figure 12:
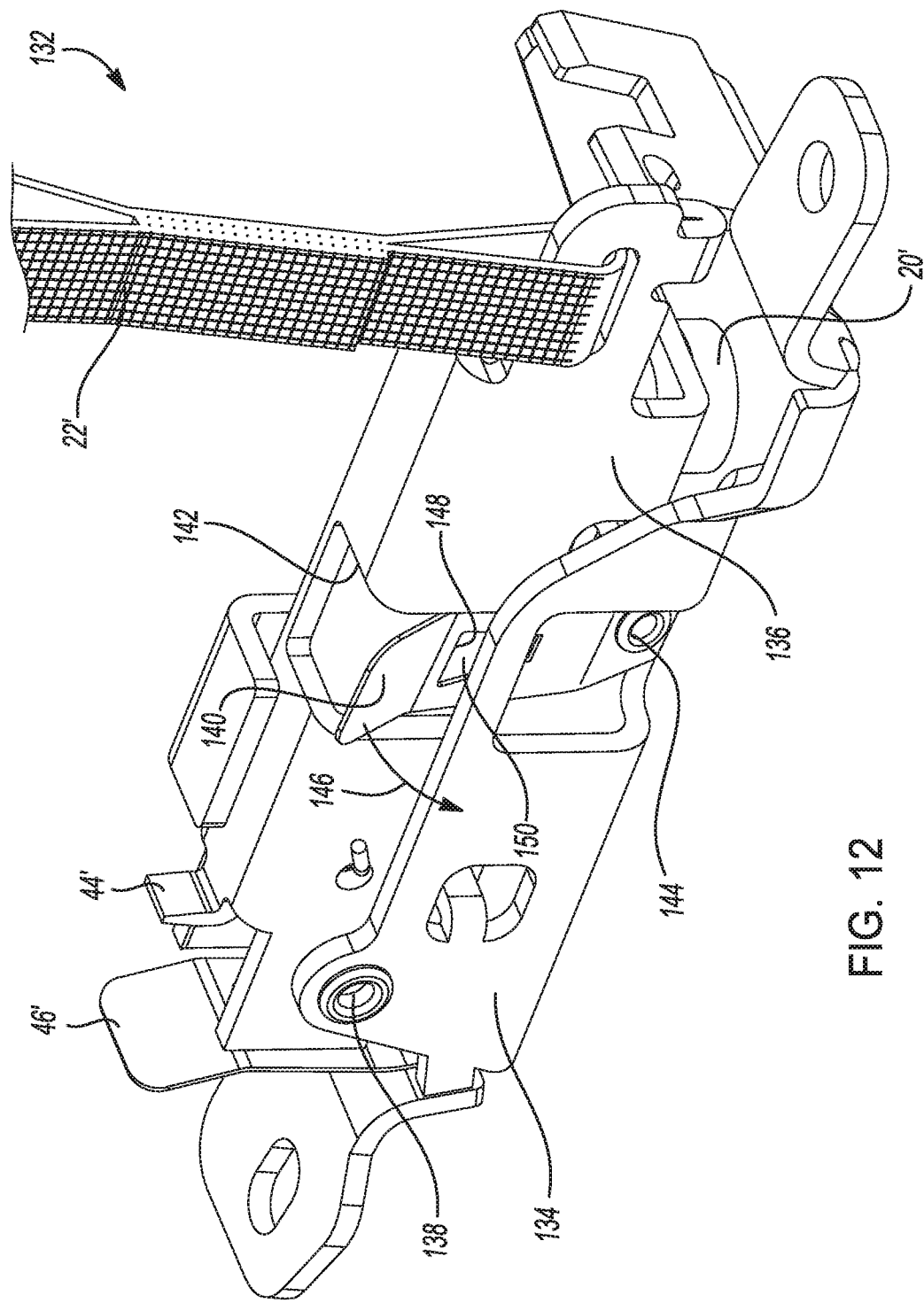
FIG. 12 is a front right perspective view of a manual park release device in a retracted position according to another exemplary embodiment.
Figure 13:
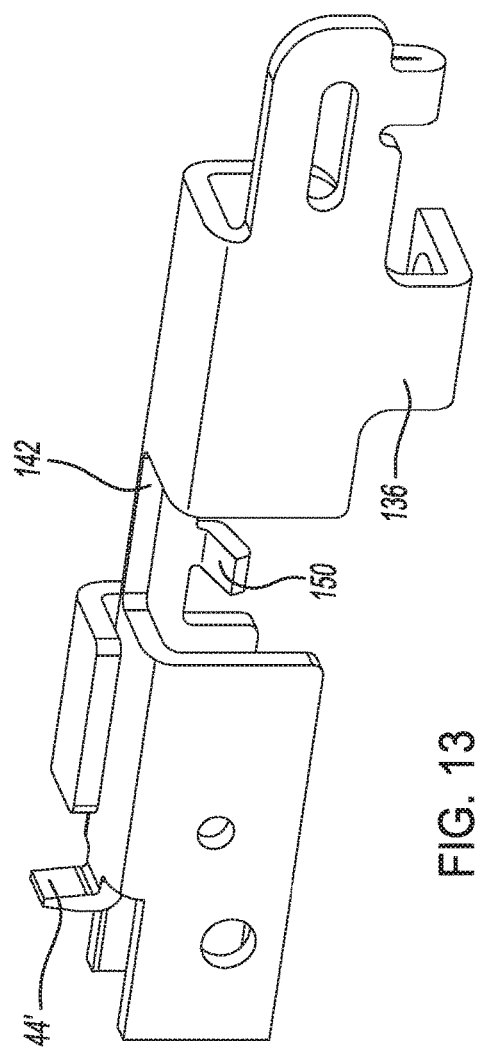
FIG. 13 is a front right perspective view of a handle portion of the manual park release device of FIG. 12.

Referring to FIG. 13 and again to FIG. 12, the tab 150 is an integral extension of the handle portion 136. The tab 150 extends partially into the space defined by the opening 142 allowing the tab 150 to be captured by the beam 140.

Figure 14:
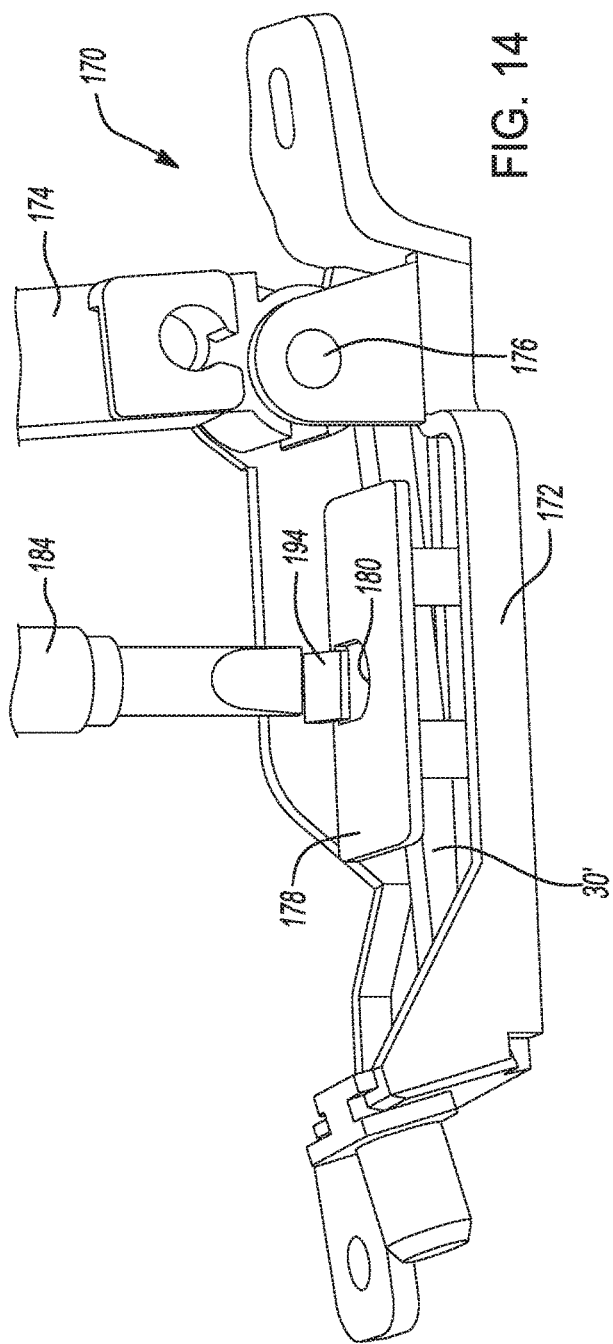
FIG. 14 is a side perspective view of a manual park release device having a release cover according to another exemplary embodiment.
Figure 15:
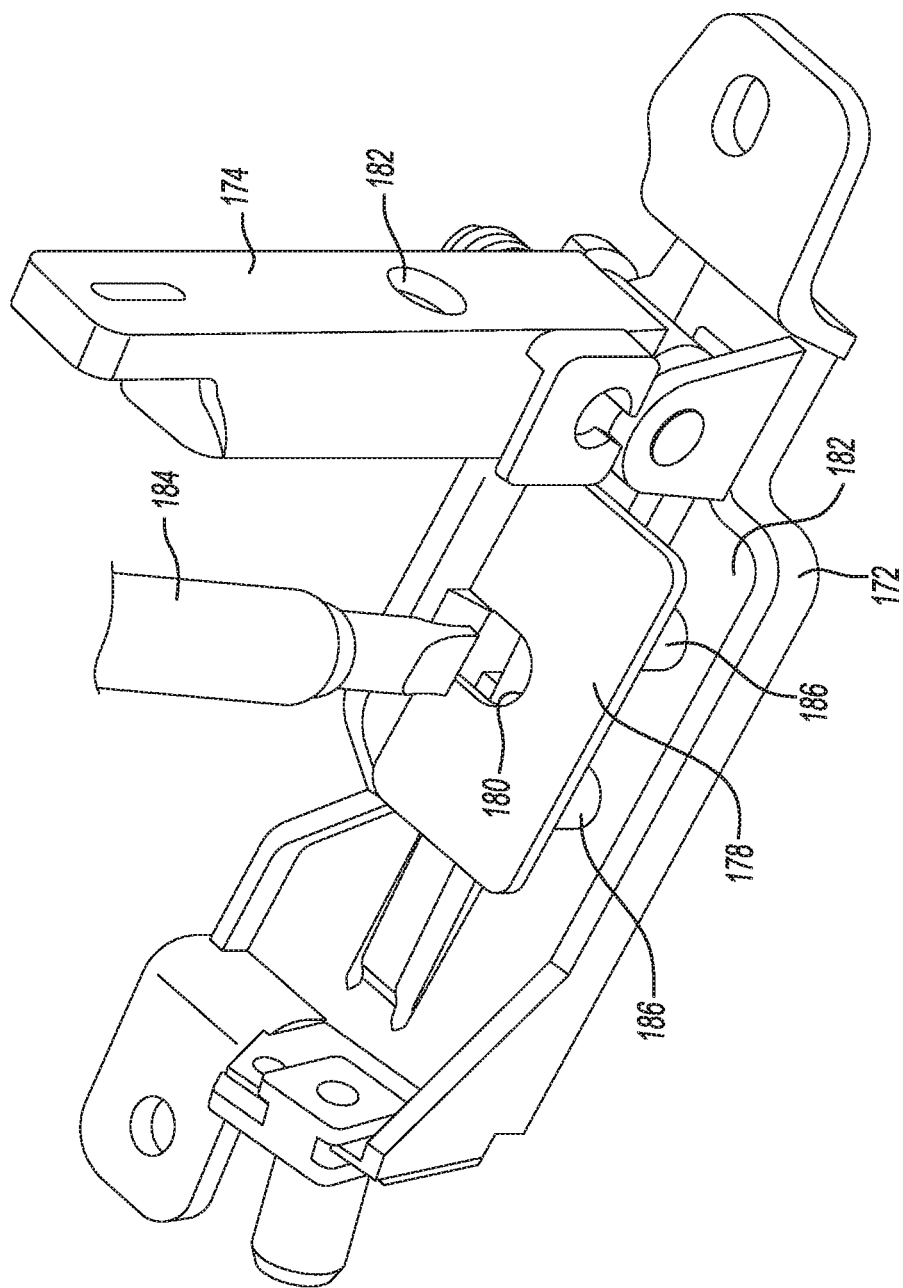
FIG. 15 is a top perspective view of the manual park release device shown in FIG. 14.

Referring to FIGS. 14, 15, and 16, a manual park release device 170 is modified from the manual park release device 10. Manual park release device 170 includes a first or base portion 172 to which is rotatably coupled to a second or handle portion 174 using a pin 176. The base portion 172 is fixed, for example by fastening to a component of a motor vehicle, similar to that shown and described in greater detail in reference to FIG. 17. According to several aspects, the base portion 172 and the handle portion 174 are both made of either a metal material such as steel or aluminum, formed for example by a brake, or a polymeric material made for example using an injection molding operation to provide the features of the manual park release device 170.

Components of the manual park release device 170 that are common in design and function with components of the manual park release device 10 such as the beam 30' are identified using a prime symbol associated with the part number and are therefore not further discussed herein.

The manual park release device 170 includes a cover 178 coupled to the base portion 172. The cover 178 defines a window 180 that is aligned with an opening 182 (FIG. 17) in the handle portion 174 when the handle portion 174 is in the retracted position (not shown). The opening 182 and the window 180 are sized to allow a tool, such as a screwdriver 184, to pass therethrough to engage the beam 30' yet sized to prevent a user's finger from passing therethrough. Thus, when the handle portion 174 is in the extended position, as shown, the cover 178 alone prevents a user's finger from engaging the beam 30'.

In the example provided, two posts 186 extend out from an inner surface 188 of the base portion 172. The posts 186 may be hollow to accept screws or other fasteners (not shown) to secure the cover 178 to the posts 186. Two support members 190 are also formed on the inner surface 188 but are disposed adjacent a side wall 192 of the base portion 172. A locking tab 194 is formed on the side wall 192 between the support members 190. The cover 178 is supported by the support members 190 and posts 186 while the locking tab 194 engages the window 180 of the cover 178 to hold the cover 178 securely to the base portion 172.

Referring to FIG. 17 and again to FIGS. 1 through 16, each of the manual park release devices of the present disclosure can be housed in a console 152 of an automobile vehicle providing a transmission shift device 154. A shift selection pad 156 is supported by the console 152 and provides visual gear position indicators including a neutral gear indicator 158. The transmission shift device 154 is used to control an automatic transmission 160, which is also connected by the tension cable 26 to one of the manual park release devices of the present disclosure. To access the manual park release device, a cover (not shown for clarity) is removed to provide access to a cavity 162 provided in the console 152. The park release device is fixed as previously described, for example using fasteners, to a structure 164 of the console 152 or of vehicle structure supporting the console 152. With the cover of the cavity 162 removed, access is provided for insertion of the tool and subsequently to pull the strap 22 provided to allow displacement the handle portion of the manual park release device from the retracted to the extended position.

A manual park release device of the present disclosure offers several advantages. These include the use of both first and second locking features, each dedicated to locking a handle portion of a manual park release device in one of a retracted position and an extended position. The first and second locking features are used coincident with a design that requires use of a tool to release the handle portion from its present position.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A manual park release device, comprising:
   a base portion;
   a handle portion rotatably coupled to the base portion to move from a retracted position to an extended position, the handle portion during rotation toward the extended position exerting a pulling force to displace a tension cable connected to an automatic transmission of an automobile vehicle to change from a first park gear to a second neutral gear;
   a first locking feature releasably restricts rotational movement of the handle portion away from the retracted position;
   a second locking feature releasably restricts rotational movement of the handle portion away from the extended position;
   a flexible beam connected to the base portion having a member engaging the handle portion to retain the handle portion in the retracted position; and
   a cover disposed within the base portion between the flexible beam and the handle portion, the cover defining a window, wherein the window is in alignment with the flexible beam and the opening in the handle portion, and wherein the window is smaller than the opening.

2. The manual park release device of claim 1, wherein the first locking feature and the second locking feature are each coupled to the base portion.

3. The manual park release device of claim 1 wherein the first locking feature includes a first slot and the second locking feature includes a second slot and a free end of the flexible beam engages the second slot when the handle portion is in the extended position.

4. The manual park release device of claim 3 wherein the second slot is oriented 90 degrees from the first slot on a periphery of the handle portion.

5. The manual park release device of claim 1 wherein the first locking feature includes a rotating member having a first section connected to a second section by a living hinge, wherein the first section engages the base portion and the second section engages the handle portion when in the retracted position.

6. The manual park release device of claim 5 wherein the handle portion includes a tab that engages the second section when in the retracted position.

7. The manual park release device of claim 6 wherein the rotating member includes a sloping face accessible through an opening in the handle portion, the sloping face engageable to pivot the second section at the living hinge away from the tab to allow the handle portion to move to the extended position.

8. The manual park release device of claim 1 further comprising a biasing member connected between the base portion and the handle portion to bias the handle portion to the retracted position.

9. A manual park release device, comprising:
a base portion;
a handle portion rotatably coupled to the base portion to move from a retracted position to an extended position, the handle portion during rotation toward the extended position exerting a pulling force to displace a tension cable connected to an automatic transmission of an automobile vehicle to change from a first park pear to a second neutral gear;
a first locking feature releasably restricts rotational movement of the handle portion away from the retracted position;
a second locking feature releasably restricts rotational movement of the handle portion away from the extended position; and
a flexible member fixed at one end to the base portion and having a free end;
wherein the first locking feature and the second locking feature are each coupled to the base portion,
wherein the handle portion includes a first end wall and a second end wall opposite the first end wall and the first end wall engages the flexible member when the handle portion is in the retracted position, and
wherein the second end wall engages the flexible member when the handle portion is in the extended position.

10. The manual park release device of claim 9 wherein the flexible member includes a first notch disposed adjacent the free end and a second notch disposed adjacent the free end on a side of the flexible member opposite the first notch.

11. The manual park release device of claim 10 wherein the first notch engages the first end wall when the handle portion is in the retracted position and the second notch engages the second end wall when the handle is in the extended position.

12. A manual park release device, comprising:
a base portion;
a handle portion rotatably coupled to the base portion to move from a retracted position to an extended position, the handle portion during rotation toward the extended position exerting a pulling force to displace a tension cable connected to an automatic transmission of an automobile vehicle to change from a first park pear to a second neutral gear;
a first locking feature releasably restricts rotational movement of the handle portion away from the retracted position; and
a second locking feature releasably restricts rotational movement of the handle portion away from the extended position,
wherein the second locking feature includes a second flexible beam connected to the base portion and having a slot engaged with the handle portion when in the extended position.

13. The manual park release device of claim 12 wherein the handle portion includes a tab that engages the slot when in the extended position.

* * * * *